(12) United States Patent
Lin

(10) Patent No.: US 6,880,791 B1
(45) Date of Patent: Apr. 19, 2005

(54) BASE WITH CLAMP

(76) Inventor: Chin-Chih Lin, 3F, No. 128, Cha-Zuang 1st Street, Kuei Shan, Taoyuan Hsien (TW)

( * ) Notice: Subject to any disclaimer, the term of this patent is extended or adjusted under 35 U.S.C. 154(b) by 0 days.

(21) Appl. No.: 10/737,810

(22) Filed: Dec. 18, 2003

(30) Foreign Application Priority Data

Oct. 29, 2003 (TW) .................................. 92219199 U

(51) Int. Cl.[7] ............................................. F16M 13/00
(52) U.S. Cl. .............................. 248/231.61; 248/231.85
(58) Field of Search ........................ 248/228.1, 228.3, 248/228.5, 231.21, 231.41, 231.61, 231.85, 231.9, 231.91, 72; 411/383, 384, 432, 433

(56) References Cited

U.S. PATENT DOCUMENTS

| | | | | |
|---|---|---|---|---|
| 1,362,856 A | * | 12/1920 | Drake et al. ................ | 248/487 |
| 2,191,085 A | * | 2/1940 | Rosen ..................... | 248/475.1 |
| 3,419,298 A | * | 12/1968 | Worley ........................ | 403/24 |
| 3,596,862 A | * | 8/1971 | Block ......................... | 248/121 |
| 4,630,982 A | * | 12/1986 | Fenner ....................... | 410/102 |
| 4,925,364 A | * | 5/1990 | Das ........................... | 415/150 |

* cited by examiner

Primary Examiner—Jon Szumny
(74) Attorney, Agent, or Firm—Troxell Law Office, PLLC

(57) ABSTRACT

A base with clamp includes a clamping barrel, a fixing bolt, a sleeve seat and clamping plate. The clamping barrel has an open bottom and a top plate with a top hole and the top hole is surrounded by a clamping recess and has at least two recess holes. The fixing bolt has a clamping rod and a fastening plate, which juts out a fastening post. The clamping rod has a diameter less than the inner diameter of the top hole with rod threads. The fastening plate has a size corresponding to the clamping recess and has screw holes corresponding to the recess hole for the screws capable of passing through the screw holes and engaging with the recess hole. The sleeve seat has a base disk and extends upward an annular step and a cylindrical ring from the base disk for fitting with the clamping barrel so as to span the annular step and the cylindrical ring at the top thereof has a central hole for being passed through by the clamping rod. The clamping plate is flat and has a threaded hole for engaging with the rod threads. Hence, the clamping plate can ascend and descend along the clamping rod by way of the base disk and the clamping plate having a size greater than a hole of a held object and being placed on and under the hole respectively and the clamping barrel being turned so that the held object can be pressingly held or released.

9 Claims, 3 Drawing Sheets

BASE WITH CLAMP

BACKGROUND OF THE INVENTION

1. Field of the Invention

The present invention relates to a base with clamp and particularly to a base suitable for a held object such as a desktop with a hole.

2. Brief Description of Related Art

A base with clamp is frequently seen in our daily lives. Because the base with clamp has a function of supporting and clamping an object placed on it, it can be widely used for holding articles such as a lamp, a file stand, a telephone stand or a connecting frame of a plane display.

Presently, places for offices or living are getting smaller so that spaces available for personal individuals and office desks become smaller too. Hence, it is an inevitable trend that stuff provided on the desktop being hung with a clamping base.

Taking a lamp as an example, a conventional and commonly used fixture for the lamp is similar to a document clip and an end of the fixture clamps an edge of the desktop and another end thereof is joined to the lamp. In this way, it is possible for the lamp being disposed above the desktop.

However, for systematized office furniture, especially for a partition system or screen system, the desktop for a personal space is mounted to partitions at right, left and rear sides of the desktop, that is, there is no place for the conventional clamping base holding the right, left and rear edges and it will impede people to move in or move out in case of the clamping base being fixed to the front edge of the desktop so as to result in inconvenience of the user during work. Besides, the preceding desktop is provided with a circular hole for being passed through by wires such as lead wires, telephone wires and signal wires so that the display, the mouse and the telephone can be placed on the desktop. Hence, it is a problem that has to be overcome is how to utilize the circular hole for locating the clamping base and being passed through by the wires.

SUMMARY OF THE INVENTION

An object of the present invention is to provide a base with clamp, which a base with clamp includes a clamping barrel, a fixing bolt, a sleeve seat and clamping plate. The clamping barrel has an open bottom and a top plate with a top hole and the top hole is surrounded by a clamping recess and has at least two recess holes. The fixing bolt has a clamping rod and a fastening plate, which juts out a fastening post. The clamping rod has a diameter less than the inner diameter of the top hole with rod threads. The fastening plate has a size corresponding to the clamping recess and has screw holes corresponding to the recess hole for the screws capable of passing through the screw holes and engaging with the recess hole. The sleeve seat has a base disk and extends upward an annular step and a cylindrical ring from the base disk for fitting with the clamping barrel so as to span the annular step and the cylindrical ring at the top thereof has a central hole for being passed through by the clamping rod. The clamping plate is flat and has a threaded hole for engaging with the rod threads. Hence, the clamping plate can ascend and descend along the clamping rod by way of the base disk and the clamping plate having a size greater than a hole of a held object and being placed on and under the hole respectively and the clamping barrel being turned so that the held object can be pressingly held or released.

Another object of the present invention is to provide a base with clamp in which the cylindrical ring and the annular step are provided with a longitudinal piercing hole and a recess is provided at the annular step corresponding to the piercing hole for being able to allow wires passing through.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
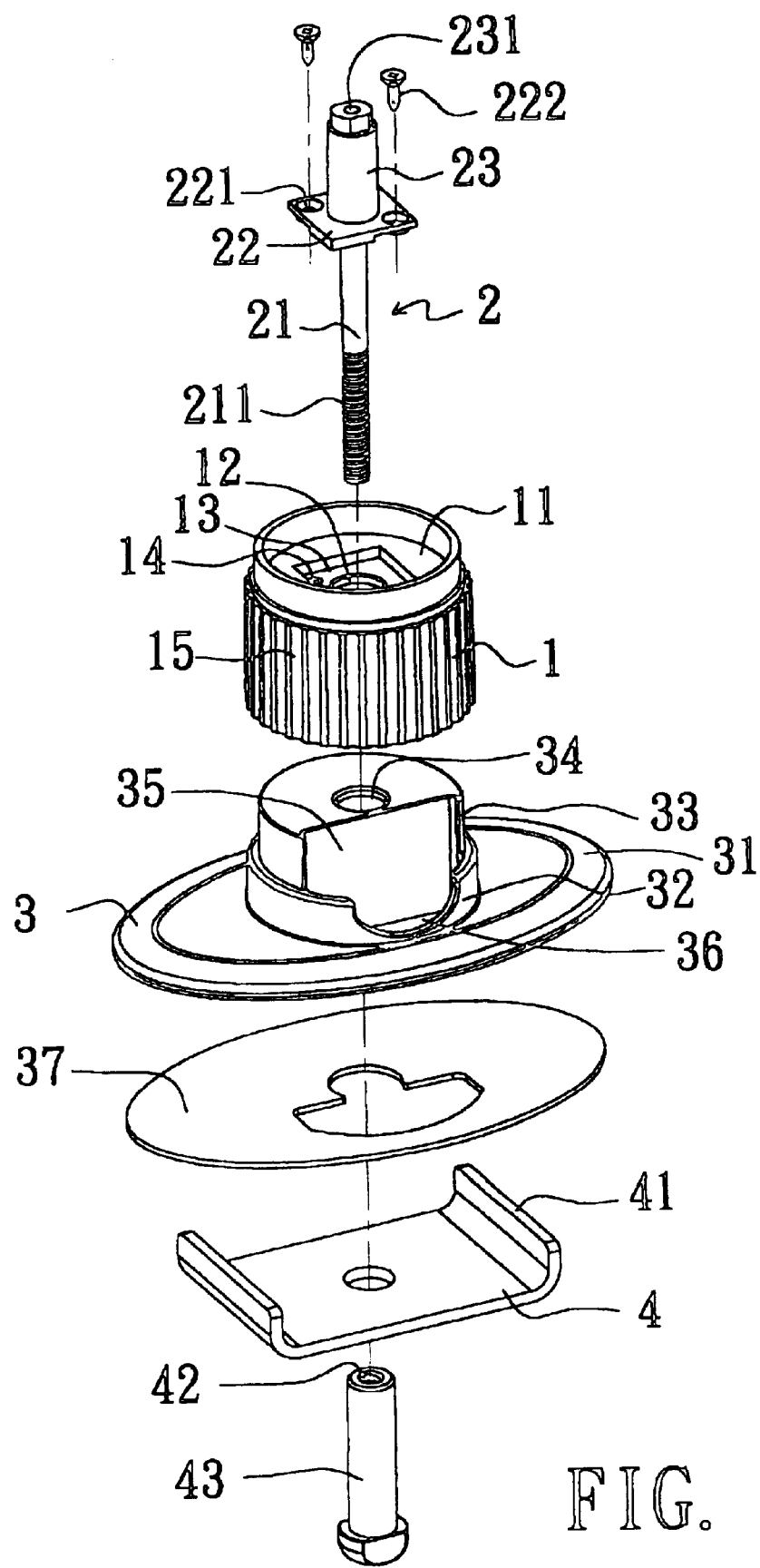
FIG. 1 is an exploded perspective view of a base with clamp according to the present invention.
Figure 2:
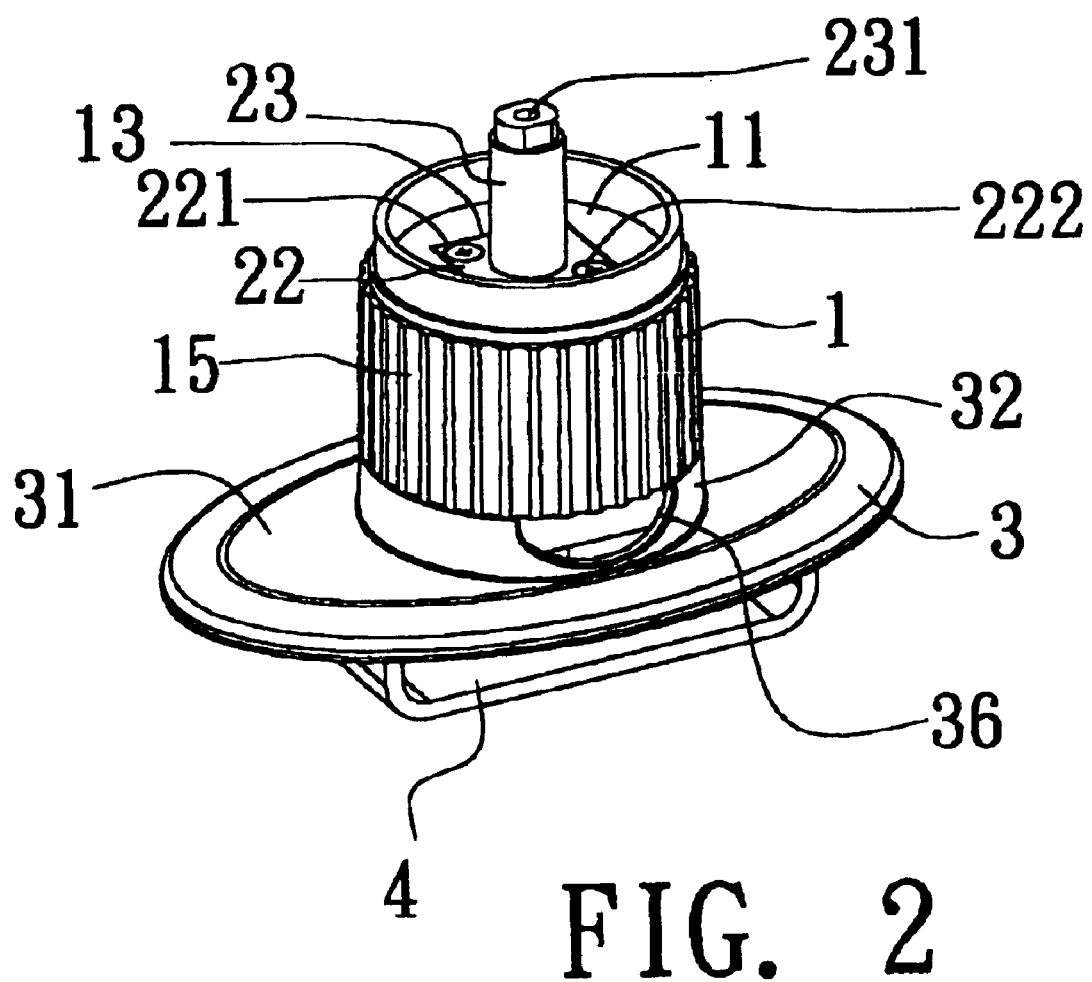
FIG. 2 is an assembled perspective view of the base shown in FIG. 1.

Referring to FIGS. 1 and 2, basically, a base with clamp includes a clamping barrel 1, a fixing bolt 2, a sleeve seat 3 and a clamping plate 4.

Wherein, the clamping barrel 1 is provided with an open bottom, which is circular as shown in the figures. Of course, the bottom can be other shapes such as square or semicircular. The clamping barrel 1 has an upper plate 11 with a central top hole 12 for being passed through and in order to be fixedly located, a recess ring 13 is arranged to surround the top hole 12 with at least two recess holes 14 for fastening with screws 22. The clamping barrel 1 at the periphery of the main body thereof can be provided with saw teeth shaped barrel groove 15 for easily exerting a force.

The fixing bolt 2 is composed of a clamping rod 21 and a fastening plate 22. The fastening plate 22 has a fastening post 23 that juts out therefrom. The clamping rod 21 has the diameter thereof less than the inner diameter of the top hole 12 with rod threads 211 thereon such that it is possible for the clamping rod 21 to engage with the clamping plate 4. The fastening plate 22 is provided with a size corresponding to the clamping recess 13 so as to be inserted into the clamping recess 13. Further, the fastening plate 22 is provided with screw holes 221 corresponding to the recess hole 14. Hence, the clamping bolt 2 can be joined to the clamping barrel 1 by way of screws 222. As shown in FIGS. 1 and 2, although the clamping recess 13 and the fastening plate 22 are shaped with rectangles, it is not a limitation. Besides, the clamping post 23, which extends from the bolt plate 22, is cylindrical with a cylindrical hole 231 shown in FIGS. 1 and 2 but it is not a limitation. The purpose of the clamping post 23 is to be joined to an extension bar of a stand or a support frame for articles and no detail will be described further because the joint of the clamping post 23 and the extension bar is not related to technique of the present invention.

The sleeve seat 3 is provided with a seat disk 31 and the seat disk 31 is oval shape shown in FIGS. 1 and 2. It is noted that other shapes for the seat disk 31 can be provided except the oval shape. It is enough that the size of the seat disk 31 is bigger than a circular hole of a desktop. The seat disk 31 at the center thereof has an upwardly extending annular step 32 and a cylindrical ring 33, which has a size corresponding to the inner diameter of the clamping barrel 1 for fitting with clamping barrel 1 such that the clamping barrel spans the annular step 32. Further, the cylindrical ring 33 at the top thereof has a central hole 34 for being passed through by the clamping rod 21. In addition, in order to make wires possible to pass through the sleeve seat 3, a longitudinal through hole 35 is provided at the annular step 32 and the cylindrical ring 33 with a U shaped recess 36 at the annular step 32 corresponding to the longitudinal through hole 35 so that the wires can pass over the longitudinal hole 35 and move out of the circular hole of the table top via the through hole 35 to be joined to related equipment. Moreover, the base disk 31 at the bottom face thereof may be associated with an anti-slip pad 37 so as to provide a function of avoiding slip.

The clamping plate 4 is flat with two opposite ends thereof each having an upwardly bending 41 respectively such that the clamping plate 4 can span two lateral sides of the circular hole at the desktop. The clamping plate 4 can be provided with a threaded hole 42 for engaging with the rod threads 211 such that the clamping plate 4 can ascend or descend along the clamping rod 21 for clipping or releasing the desktop with the base disk 31 commonly. The threaded hole 42 also can be attached to the upper end of a support post 43, which is fixed to or fits with the clamping plate 4. In this way, the clamping rod 21 can be reduced the length thereof and can be disposed in the circular hole of the desktop via the support post 43 to reduce the rotational time of the clamping barrel 1.

Referring to FIG. 2 again, while the base with clamp of the present invention is set up, the clamping rod 21 of the clamping bolt 2 is arranged to pass over the top hole 12 and the clamping bolt 2 can be located at the clamping barrel 1 by way of the screws 222 passing through the screw holes 221 and fastening to the recess holes 14. Then, the clamping barrel 1 is arranged to fit with the cylindrical ring 33 with the clamping rod 21 passing through the central hole 34. In the mean time, the threaded hole 42 at the top of the support post 43 of the clamping plate 4 engages with the rod threads 21 of the clamping rod to complete the assembly.

Figure 3:
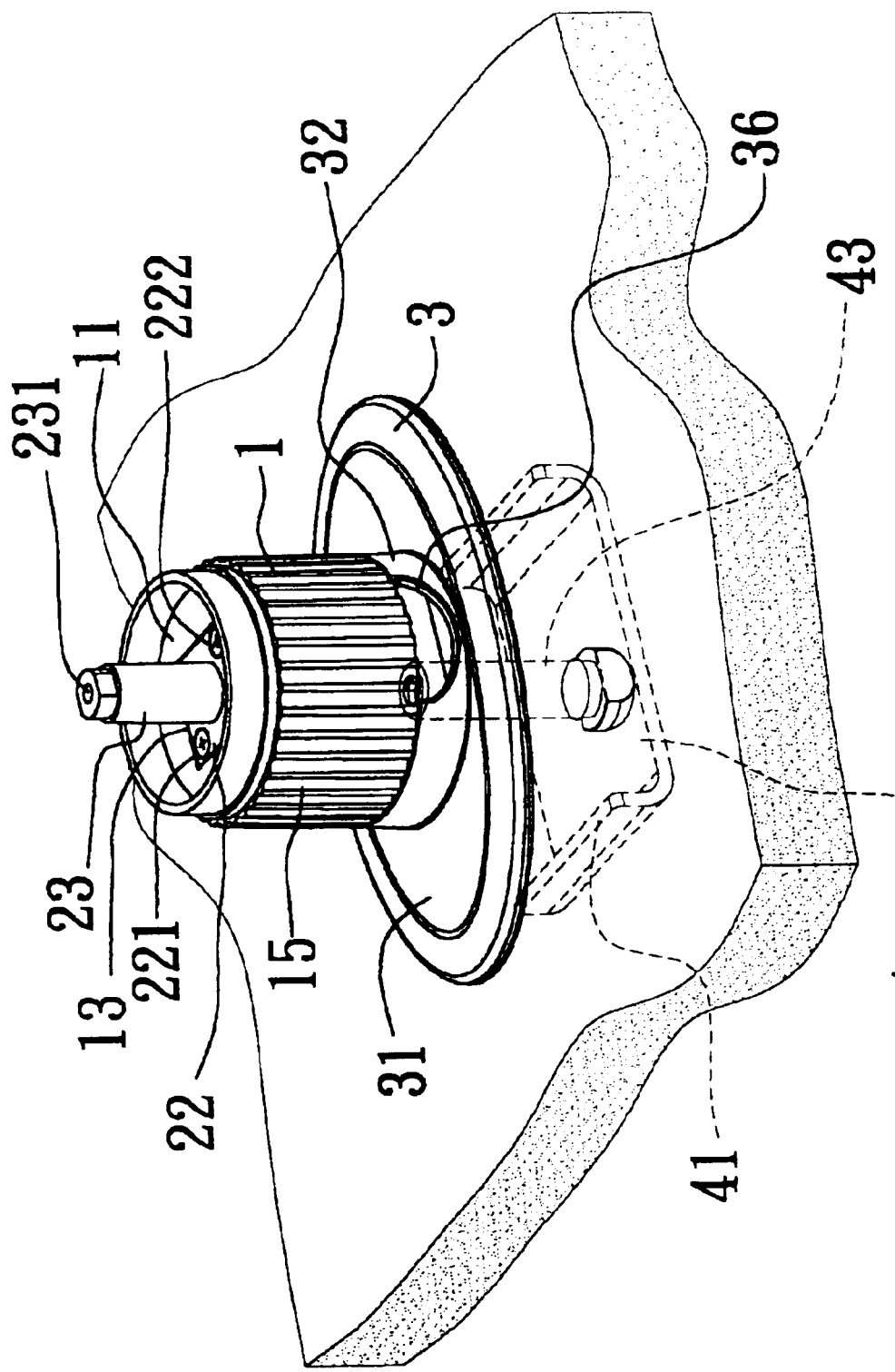
FIG. 3 is a perspective view illustrating the base being in a state of clamping.

Referring to FIG. 3, in practice, the annular step 32 of the sleeve seat 3 is placed on a held object, such as the circular hole of the desktop, first. Next, the assembled clamping barrel 1 and the clamping bolt 2 are fitted to the cylindrical ring 33 to allow the clamping rod 21 passing over the central hole 34 and being disposed in the circular hole and the clamping plate 4 is placed under the circular hole to allow the two up-bend edges being disposed at two lateral sides of the circular hole with the support post 43 inserting into the circular hole and the screw holes 42 engaging with the rod threads 211. Finally, the clamping barrel 1 is turned along with the rod threads 211 such that the clamping rod 21 moves upward to clamp the desktop by way of the two contact edges 41 and the base disk 31 holding the desktop commonly.

It is appreciated that the base with clamp of the present invention can overcome the disadvantage of the desktop being not clamped due to edge parts of the desktop being enclosed and it can obtain firmness of clamping completely only by means of the original circular hole for being passed through by wires. Furthermore, the through hole and the recess arranged in the cylindrical ring and the annular step respectively can be passed over by the wires to reserve the original function with enhancing visual sense of beauty that is unable to be reached by the conventional clamping base.

While the invention has been described with reference to the preferred embodiment thereof, it is to be understood that modifications or variations may be easily made without departing from the spirit of the invention, which is defined in the appended claims.

What is claimed is:

1. A base with clamp, comprising:

a clamping barrel, having an open bottom and a top plate with a top hole, the top hole being surrounded by a clamping recess and providing at least two recess holes;

a fixing bolt, having a clamping rod and a fastening plate, from which juts out a fastening post, the clamping rod having a diameter less than an inner diameter of the top hole with rod threads, the fastening plate having a size corresponding to the clamping recess and having screw holes corresponding to the recess hole for screws passing through the screw holes and engaging with the recess holes;

a sleeve seat, having a base disk with an upwardly extending annular step, and an upwardly extending cylindrical ring for fitting with the clamping barrel such that the clamping barrel spans the annular step and the cylindrical ring at a top thereof having a central hole for being passed through by the clamping rod; and a clamping plate, being flat and having a threaded hole for engaging with the rod threads;

whereby, the clamping plate can ascend and descend along the clamping rod by way of the base disk and the clamping plate having a size greater than a hole of a held object and being placed on and under the hole respectively and the clamping barrel being turned so that the held object can be pressingly held or released.

2. The base with clamp according to claim 1, wherein the clamping barrel is cylindrical with a periphery thereof having saw teeth shaped grooves.

3. The base with clamp according to claim 1, wherein the fastening post at a center thereof is provided with a post hole.

4. The base with clamp according to claim 1, wherein the cylindrical ring and the annular step are provided with a longitudinal hole and the annular step has a recess corresponding to the longitudinal hole so as for wires being able to pierce and pass through.

5. The base with clamp according to claim 4, wherein the recess has a U shape.

6. The base with clamp according to claim 1, wherein the clamping plate at two lateral ends thereof is upwardly bent to constitute respective contact edges.

7. The base with clamp according to claim 1, wherein the threaded hole is provided at a top of a support post extending downward therefrom.

8. The base with clamp according to claim 7, wherein the support post is fixed to or fits with the clamping plate.

9. The base with clamp according to claim 1, wherein the base disk is associated with a anti-slip pad.

* * * * *